(12) United States Patent
Bowers et al.

(10) Patent No.: US 6,385,263 B1
(45) Date of Patent: May 7, 2002

(54) METHOD AND APPARATUS FOR ACCOMPLISHING HIGH BANDWIDTH SERIAL COMMUNICATION BETWEEN SEMICONDUCTOR DEVICES

(75) Inventors: Richard Bowers, Scotts Valley; Kelvyn Evans, Aptos; Grahame Measor, Scotts Valley, all of CA (US)

(73) Assignee: Hiband Semiconductor, Inc., Scotts Valley, CA (US)

( * ) Notice: Subject to any disclaimer, the term of this patent is extended or adjusted under 35 U.S.C. 154(b) by 0 days.

(21) Appl. No.: 09/710,740

(22) Filed: Nov. 10, 2000

Related U.S. Application Data

(62) Division of application No. 09/376,148, filed on Aug. 17, 1999, now Pat. No. 6,233,294.

(51) Int. Cl.[7] ................................................ H04L 7/00
(52) U.S. Cl. ........................ 375/356; 375/362; 375/377
(58) Field of Search ................................. 375/219, 220, 375/222, 257, 354, 356, 362, 377; 370/419

(56) References Cited

U.S. PATENT DOCUMENTS

| | | | | |
|---|---|---|---|---|
| 5,140,611 A | * | 8/1992 | Jones et al. ................. | 375/119 |
| 5,555,548 A | * | 9/1996 | Iwai et al. ................... | 375/356 |
| 5,963,609 A | * | 10/1999 | Huang ......................... | 375/377 |

* cited by examiner

*Primary Examiner*—Young T. Tse
(74) *Attorney, Agent, or Firm*—Donald R. Boys; Central Coast Patent Agency, Inc.

(57) ABSTRACT

A serial communication system for two IC devices has a separate master chip connected to both of the IC devices, the master chip having a clock generator and circuitry for affecting serial data transmission and control between the master chip and the devices. There is a slave component on each IC device for transforming data between parallel and serial data formats and for sending and receiving a serial data stream. The master chip provides a clock signal to both slave components for gating serial data communication, and manages all communication between the two slave components. In a preferred embodiment all circuitry in the slave components is digital circuitry, and all analog circuitry is implemented on the master chip. Also in a preferred embodiment each slave periodically checks phase between data stream and clock stream received, and inserts a correction code in the data stream sent back to the master chip, so the master chip can regularly correct the phase for clock and data sent to each slave.

10 Claims, 5 Drawing Sheets

METHOD AND APPARATUS FOR ACCOMPLISHING HIGH BANDWIDTH SERIAL COMMUNICATION BETWEEN SEMICONDUCTOR DEVICES

CROSS-REFERENCE TO RELATED DOCUMENTS

This patent application is a Divisional application from U.S. patent application Ser. No. 09/376,148, filed on Aug. 17, 1999 and copending at the time of filing the present application. The prior application has since issued as U.S. Pat. No. 6,233,294.

FIELD OF THE INVENTION

The present invention is in the field of serial data transmission as it applies to computerized semiconductor devices and pertains more particularly to methods and apparatus for achieving high speed serial data transmission between semiconductor devices.

BACKGROUND OF THE INVENTION

The art of designing and implementing very large scale integration (VLSI) devices has become more complex and sophisticated in recent years. Sophisticated software design tools and automated techniques have replaced prior pencil and paper engineering practices once used to design semiconductor devices. As VSLI devices have become more complex in terms of circuitry and design with shrinking device geometry, requirements for data transmission between such devices have also become more complex and demanding to maintain in operation.

The preferred system used for data transmission between VLSI and other IC devices has long been the system of parallel data transfer. The current parallel method of passing data between such devices incorporates the use of a plurality of separate data-signal transmission paths in parallel. Data passed between two communicating devices travels across a circuit board on a plurality of parallel traces or lines. For a 16-bit system, for example, there will be in a parallel system a separate trace for each bit (16 traces) plus control lines.

Generally speaking, much operational and specification data regarding the manufacture and operation of VLSI type devices is known and available in the art. Manufacturers of such devices provide exhaustive documentation, and virtually all such documentation are available to the skilled artisan. Therefore detailed architectural and functional descriptions of known VLSI-type devices are not provided herein. It is enough to say that parallel data must be clocked, synchronized and latched in order to enable successful transmission of the data from a propagating device to a receiving device over a circuit board containing a substantially large number of traces.

Another system for transferring data in general, and also sometimes used for transferring data between IC devices the serial system. The current art serial method of transferring high bandwidth data between VLSI devices involves the use of encoding and decoding circuits on each device to manipulate parallel data so that it may be transmitted serially across a circuit board from one device to another. For example, a parallel to serial data converter in a sending device enables data to be prepared for transmission out in a serial manner using a single data line for one-way transmission. A decoder circuit in a receiving device decodes the serial data using a predetermined decoding scheme then processes the data. Because, given a single clock speed for both, serial data transfer is typically slower than parallel transfer, a high-speed clock is typically used with the serial system to speed up transmission of serial data between devices.

Another problem with serial data transfer between IC devices in current technology is that analog circuitry is typically required in the IC devices to effect the system. Analog circuitry is known to be notoriously more difficult to implement than digital circuitry, and makers of digital IC devices are not anxious to suffer the yield losses attendant on adding analog circuitry to their devices.

Still, even with the known and perceived disadvantages of serial data transmission, the high cost and complexity of parallel systems is an increasing problem. As computing systems have matured from 4 to 8 to 16 to 32 bit words, and as microprocessors and memories (for example) have become more functional and sophisticated, the number of traces and pins necessary to accomplish adequate transmission has increased dramatically. It is, for example, common now to have plural sets of parallel data transmission pathways serving a single IC device. The high number of traces necessary on a PC board (for example) makes such support systems enormously complex and expensive to design and manufacture. Moreover, every trace demands a separate pin on the IC device. Many devices have more than two hundred pins, and future devices may demand even more. The higher and higher pin count makes such devices more complex to build and increases losses (yield) in fabrication.

Another limitation relates to precious design space. For example, increasing the number of parallel devices complicates the physical connection scheme between a propagating device and a receiving device on a circuit board. Furthermore, the propagation delay of each data path from line to line must be kept common to ensure successful data reception. Adding to many traces may cause a significant variance in individual propagation delays leading to errors in data flow.

Other problems associated with adding additional data traces to facilitate parallel transmission of more data over a shorter period include increased electromagnetic emissions to adjacent circuitry and increased power requirements needed to support the hardware. Increased emissions may infect adjacent signal lines causing noise and increasing the possibility of data errors. Increasing power requirements reduces chip reliability and may require additional power-dissipation devices to be included in chip manufacture.

It is a goal in chip design to be able to transmit more data at higher rates. However, achieving this objective using parallel data transfer techniques creates complexity and added cost. It is well known that the current-art serial methods reduce the number of required data traces for data transmission. However, the complex analog circuitry required to achieve a comparable result with the parallel method at higher clock speeds presents technical obstacles related to the complex nature of the added circuitry, which ultimately lends leads to error prone data transmission.

Therefore, what is clearly needed is a method and apparatus that enables a high-speed serial intercommunication between VLSI and other semiconductor devices, fast enough to compete with at least present day parallel systems, and in a manner to overcome the complex issues in the art described above. Such a method and apparatus will provide a serial data transmission system that is competitive to the parallel system at high clock speeds, and will reduce the design complexity related to the physical connection scheme required between devices.

SUMMARY OF THE INVENTION

In a preferred embodiment of the present invention a serial data communication system for communication between a first and a second IC device is provided, comprising a separate master chip connected to both the first and to the second IC devices, the master chip comprising a clock generator and circuitry for affecting serial data transmission and control between the master chip and the first and second IC devices; and a slave component on each IC device for transforming data between parallel and serial data formats and for sending and receiving a serial data stream. The master chip provides a clock signal to both slave components for gating serial data communication, and manages all communication between the two slave components. Preferably all circuitry in the slave components is digital circuitry, and all analog circuitry is implemented on the master chip.

In one embodiment of the invention each slave component sends a serial data stream to the master chip for transfer to the opposite slave component, receives serial data stream from the master chip provided by the opposite slave component, and compares phase between the serial data stream received and the clock signal. Upon detecting a phase difference between the clock signal and the serial data stream received, each slave component sends a correction code in the serial data stream sent to the master chip, the correction code indicating a correction in phase to be made between the clock signal and the serial data stream received by the slave component. Upon receiving the correction code the master chip causes a correction to be made in the phase between the clock signal and the serial data stream being sent to the slave component sending the correction code.

In preferred embodiments of the invention each slave component inserts a correction code in the serial data stream being sent to the master chip at a fixed period in the data stream, regardless of phase difference detected, and adjusts the code sent according to the phase difference detected, if any. To insert the correction code in the serial data stream being sent to the master chip, the slave component stops propagation of the serial data stream momentarily, causing data to be absorbed in a first-in-first-out (FIFO) buffer while the correction code is inserted.

In preferred embodiments the slave components comprise a multiplexer (mux) for parallel to serial data conversion, the mux taking parallel data from the associated IC device and converting the parallel data to serial data, and the FIFO buffer is placed ahead of the mux to handle parallel rather than serial data. Each slave component receives serial data from the master chip, decodes the data and removes the correction codes, and processes the serial data via a demultiplexer to convert the serial data to parallel data for the associated IC device.

In another aspect of the invention a slave circuitry for inclusion on a digital IC chip is provided, comprising a data-in serial port and a data-out serial port for exchanging serial data with a master chip; a clock in port for receiving a clock stream from the master chip; and a phase comparator for determining phase difference between the clock stream received and serial data received at the data-in port. There is preferably a multiplexer (mux) for converting parallel data from an IC chip upon which the slave circuitry is implemented to serial data, an encoder circuit in the serial data stream from the mux, and a driver after the encoder for driving the serial data out the data-out port, wherein the encoder places a correction code periodically in the serial data stream, the correction code selected according to phase error determined by the phase comparator. There is preferably a first-in-first-out (FIFO) buffer before the mux, wherein the encoder stops the serial data stream to the data-out port while inserting the correction codes, and parallel data is buffered in the FIFO. There may also be a decoder circuit coupled to the data-in port and a demultiplexer (demux) coupled to the decoder circuit, wherein the decoder circuit strips correction code from serial data received at the data-in port, and the demux converts the serial data received to parallel data for the IC device on which the slave circuitry is implemented.

In yet another aspect of the invention a master serial data communication chip is provided, comprising a clock generator coupled to first and second clock-out ports; a first data-in port coupled to a first data out port through first serial retiming circuitry; and a second data-in port coupled to a second data-out port through second serial retiming circuitry. The master chip receives a first serial data stream at the first data-in port from a first slave component on a first IC device, retimes and sends the first serial data stream on to a second slave component on a second IC device via the first data-out port, receives a second serial data stream at the second data-in port from the second slave component on the second IC device, retimes and sends the second serial data stream on to the first slave component on the first IC device via the second serial retiming circuitry, and sends a common clock stream to the first and second slave components via the first and second clock-out ports.

In the master chip there is preferably a first correction code detect circuit connected to the first data-in port and to a first phase adjust circuit also connected to the first clock out port, and a second correction code detect circuit connected to the second data-in port and to a second phase adjust circuit also connected to the second clock out port, wherein the respective code detect circuits detect correction codes sent by the respective slave components and cause the phase adjust circuits to adjust the clock streams to correct phase between data-out and clock to each slave component according to incoming correction codes.

In the master chip the first serial retiming circuitry may have first phase lock, phase adjusting, and retiming circuitry, and the second serial retiming circuitry may have second phase lock, phase adjusting and retiming circuitry such that data in in each direction is retimed and phase locked with clock out and data out in the same direction, the master chip thus managing data from one IC device to the other in each direction.

In yet another aspect of the invention a method for accomplishing serial data transfer between two IC devices is provided, comprising steps of (a) managing serial data streams between the two IC devices, each device having serial data receiving and sending slave circuitry, through a central master chip; and (b) supplying a common clock signal for the receiving and sending circuitry on the two IC devices from the central master chip. In this method preferably the master chip phase locks and retimes data received from one slave circuit before sending the data stream to the other slave component, and each slave circuitry determines phase offset between clock signal received from the master chip and serial data received from the master chip, and inserts a correction code in serial data sent back to the master chip. The master chip then receives the correction codes and corrects phase accordingly between data streams and clock streams sent to each slave circuitry.

In still another embodiment a method for cost-effectively providing serial communication between two IC devices is provided, comprising steps of (a) implementing multplex, demultiplex, driver, and receiver circuitry in slave circuit modules on each of the two IC devices entirely in digital circuitry; and (b) connecting the two slave circuit modules through a master chip incorporating all necessary digital circuitry for the serial communication. In this method there may be a further step for (c) sending a common clock signal to the two slave circuit modules from the master chip.

In the embodiments of the present invention taught in enabling detail below, for the first time a serial communication system is provided in the art wherein IC manufacturers may implement serial chip-to-chip communication without suffering the expense of including analog circuitry on the expensive and complex IC devices, which historically increases yield losses.

DESCRIPTION OF THE DRAWING FIGURES

DESCRIPTION OF THE PREFERRED EMBODIMENTS

Figure 1:
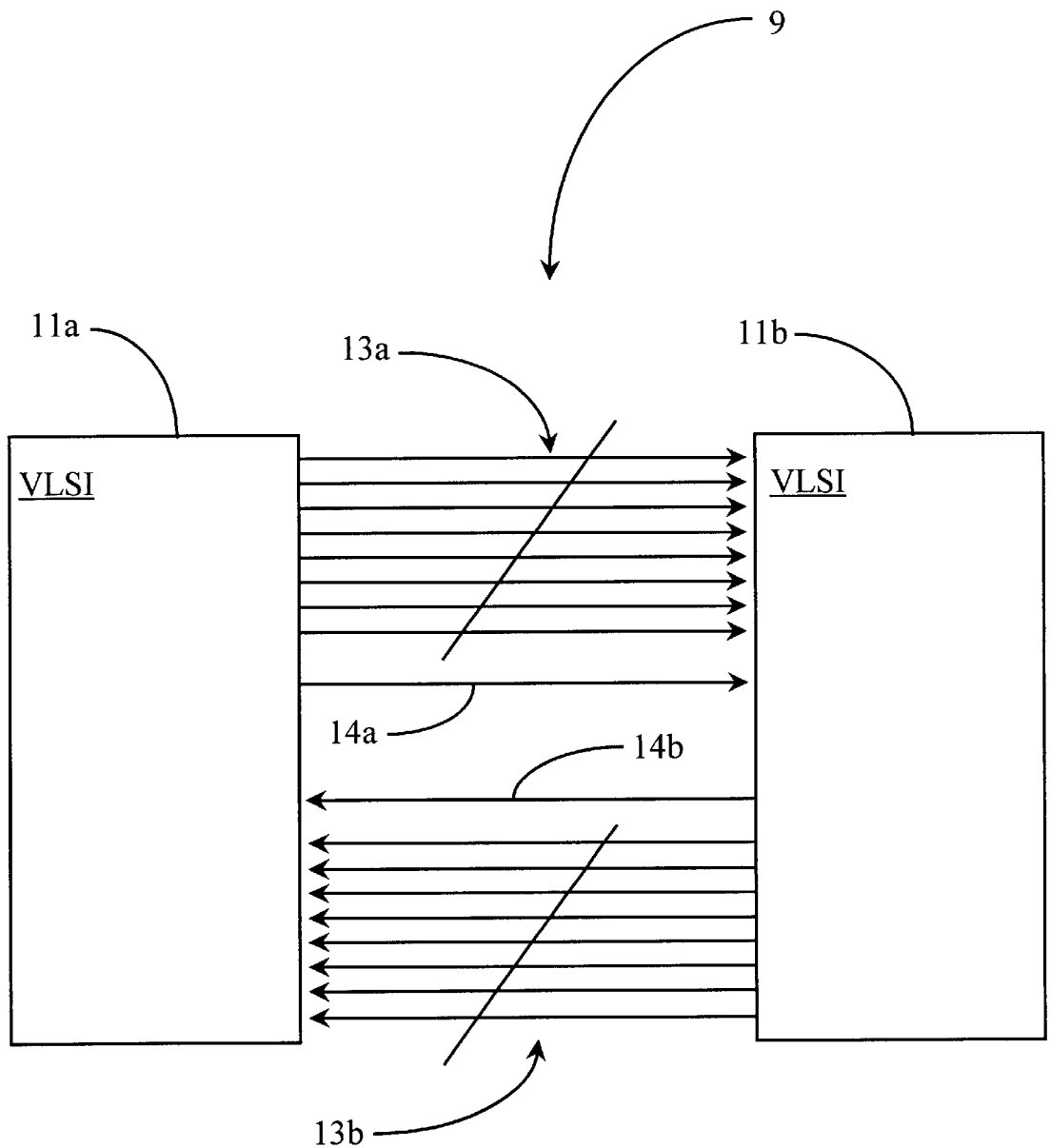
FIG. 1 is block diagram illustrating a parallel data interconnection between VLSI devices according to prior art.

FIG. 1 is a block diagram generally illustrating a parallel data interconnection 9 between VLSI devices 11a and 11b according to prior art. Interconnection 9 represents the current art practice of interconnecting two or more semiconductor devices on such as a printed circuit board for the purpose of enabling data transfer between the devices. In this embodiment, devices 11a and 11b are VLSI devices that are known in the art to be relatively large and expensive semiconductor components capable of, and needful of, transmitting a considerably large amount of data at high data rate As described in the background section, devices 11a and 11b typically contain many connector pins and peripheral to enable connection to a plurality of physical parallel traces that connect the two devices on the circuit board for data transfer. Illustrated herein are parallel trace grouping 13a, which represents a plurality of data transfer lines from device 11a to device 11b, and parallel trace grouping 13b, which represent unidirectional data transfer lines from device 11b to device 11a.

Trace groupings 13a and 13b include control lines and ground lines as is known in the art. The system represented by interconnection 9 contains in this example 32 data lines (traces). A typical clock speed for such a system is 80 MHZ, provided by such as clock lines 14a and 14b. The overall data transfer rate is limited by the clock speed and the number of traces.

Interconnection 9 is typical in the art in terms of number of data traces and applied clock speed often used for parallel data transfer between devices, however, many other variations of interconnection 9 are also known and routinely implemented. Interconnection 9 is intended to represent just one prior art example of a typical parallel data interconnection between two mounted devices.

Figure 2:
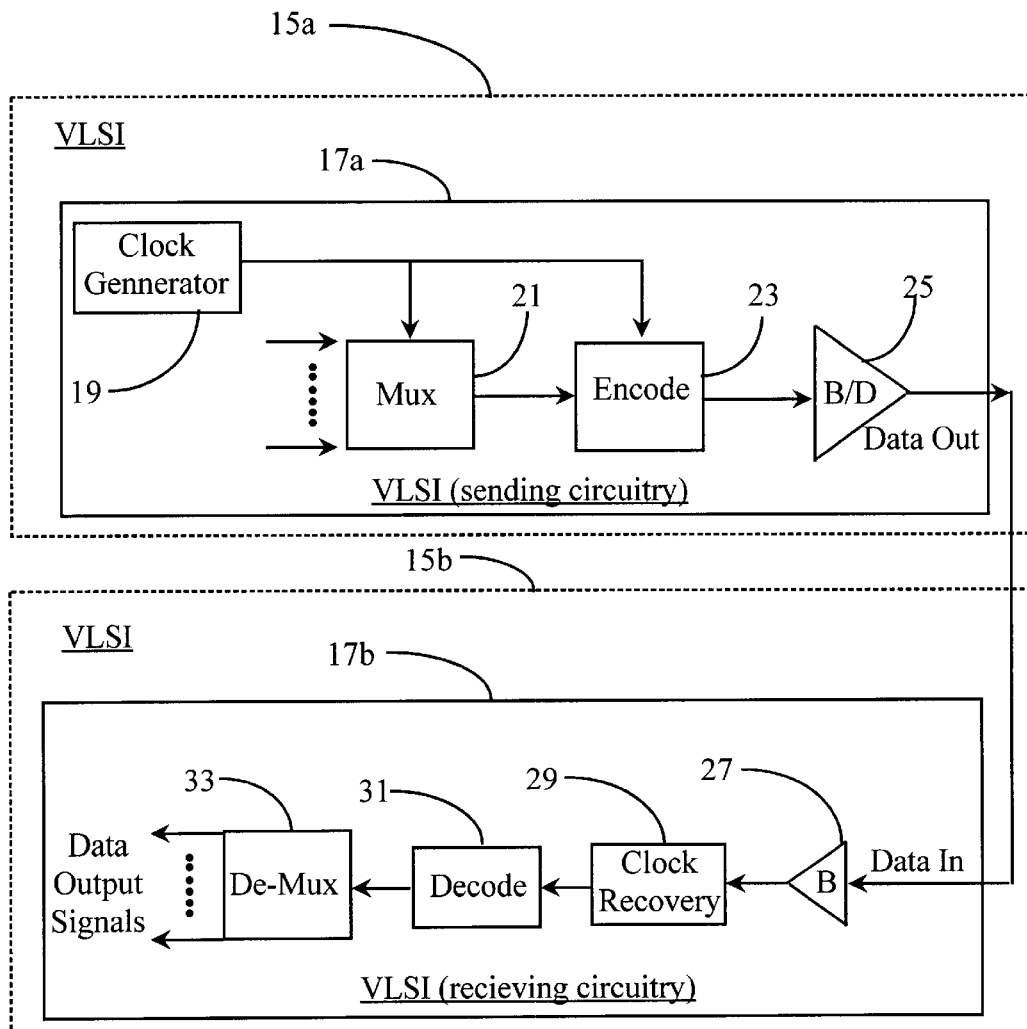
FIG. 2 is a block diagram illustrating a serial data interconnection between VLSI devices according to prior art.

FIG. 2 is a block diagram illustrating a serial data interconnection between VLSI devices 15a and 15b according to prior art. This interconnection represents one example of a typical serial data interconnection. In this example, device 15a is sending data and device 15b is receiving the data sent by device 15b. One with skill in the art will understand that devices 15a and 15b may be bi-directional devices (able to receive and send data). In this prior art example, only a unidirectional data transfer is illustrated. Further the skilled artisan will recognize that the circuitry illustrated is but a small portion of the circuitry on each VLSI device.

Device 15a has a serial sending module 17a consisting largely of analog circuitry installed therein and adapted for converting parallel data to serial format for transmission out over a single data line to another device such as device 15b illustrated herein. Module 17a comprises a clock generator 19, a parallel-to-serial multiplexer (Mux) 21, a data encoder 23, and a driver 25.

Clock generator 19 produces a clock signal for gating the operation of the devices in the system. Mux 21 receives parallel data from traces on the chip and converts the data to a serial stream that is transferred over a single line. The serial data stream is synchronized with the generated clock signal. The serial data is then encoded by encode circuit 23 as known in the art. Once the serial data is encoded, driver 25 provides the correct output voltage control for transmission of the serial signal over whatever trace connects the chips.

Device 15b has a largely analog module 17b installed therein and adapted to receive the encoded serial data sent by device 15a and to convert the data back to parallel format. Module 17b comprises a data buffer 27, a clock recovery circuit 29, a decoding circuit 31, and a serial to parallel data converter demultiplexer (De-Mux) 33. Serial data coming in is buffered (signal amplified) in buffer 27. Clock recovery circuit 29 adjusts the signal phase back to the original clock frequency (extended clock line not shown). Decoding circuit 31 decodes the serial data as is known in the art. De-Mux circuit 33 then converts incoming serial data back to parallel data for transmission to other appropriate areas of VLSI device 15b.

It is noted here that both devices 15a and 15b may be assumed to have appropriate receiving or sending analog modules installed therein that are complimentary to the respective modules 17a and 17b illustrated in this embodiment. The inventor deems that illustrating only one of each module (one send and one receive) is sufficient for explanation of the prior art function. The components contained in modules 17a and 17b are indicative of typically analog circuitry components known in the art for enabling a typical serial interconnect.

The prior art example illustrated herein with FIG. 2 is not considered a preferable implementation between such as VLSI chips 15a and 15b wherein much data is routinely transferred. Rather, a serial interconnection such as interconnection 10 would be better suited for smaller devices. The main disadvantage in this implementation as illustrated is that it would require a very fast clock speed to maintain a competitive edge with the parallel data example of FIG. 1. Moreover, complex analog enhancements would be required to modules 17a and 17b for this prior art example to be comparable in performance (data rate and error-state) to the example of FIG. 1. Such an addition in analog capability would drastically increase the cost of manufacture for devices 15a and 15b. The added cost of manufacturing will at least off-set, and most often, out weigh any benefit derived from the reduced architectural requirements relating to connector pins on devices 15a and 15b and physical traces installed on a supporting circuit board.

Figure 3:
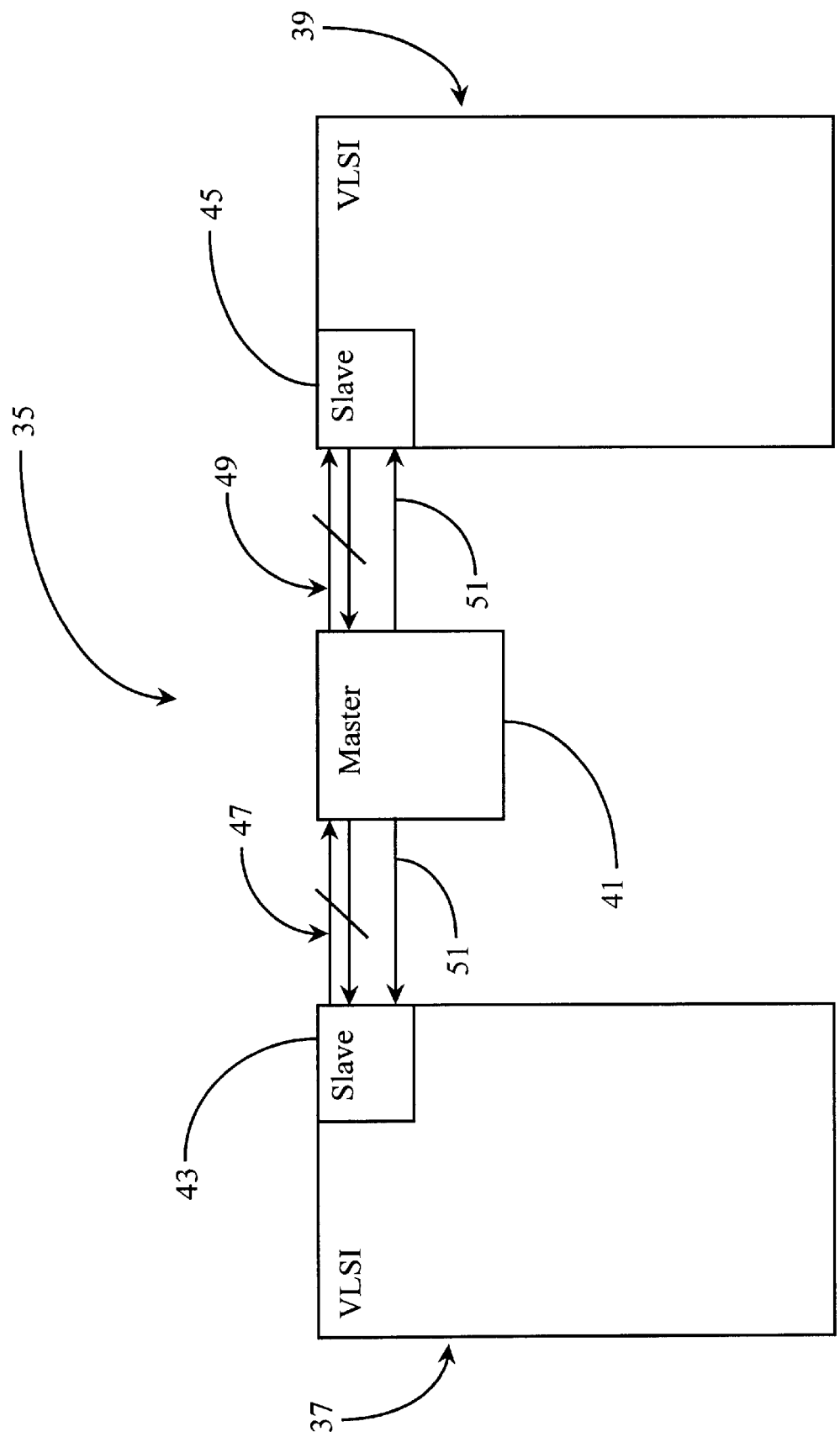
FIG. 3 is block diagram illustrating a master/slave serial data interconnection between VLSI devices according to an embodiment of the present invention.

FIG. 3 is block diagram illustrating a master/slave serial interconnection system 35 between VLSI devices 37 and 39 according to an embodiment of the present invention. Interconnection system 35 uses master/slave architecture to connect a VLSI device 37 to a VLSI device 39. Devices 37 and 39 may be assumed for this example to be mounted on a printed circuit board similar to devices in the prior art examples illustrated above. Interconnection system 35 comprises a master component 41, in this example a separate chip, and two slave components 43 and 45, in this example specific portions or regions of the respective VLSI devices. Master component 41 is a unique device adapted to carry all of the required analog circuitry for facilitating serial data transfer between devices 37 and 39.

Slave components 43 and 45 are send/receive circuits adapted to replace the prior art circuitry that would normally be found in devices enabled for serial communication, and are devoid of analog circuitry, comprising only relatively common digital circuitry elements. Slave component 43 is built into device 37 in manufacture, and slave component 45 is built into device 39 in manufacture. Slaves 43 and 45 are typically mirror-image implementations, but it not required that it be so.

In practice of the present invention, slave components 43 and 45 transfer data through master component 41. A serial data connection 47, consisting in this example of two data-carrying lines, is provided to connect slave 43 in VLSI device 37 to master component 41. A serial data connection 49, also consisting in this example of two data-carrying lines, is provided to connect slave 45 in VLSI device 39 to master 41. Two lines connecting the master to each slave provide for simultaneous data transfer in each direction. Master component 41 acts as a controlling interface between slaves 43 and 45, and has all necessary analog circuitry.

A high speed clock line 51 is provided and adapted to carry a high speed clock signal generated in master 41 to each of slaves 43 and 45. Clock line 51 controls the data rate for serial transmission over connections 47 and 49 in either direction. This is a dedicated clock for data transmission and is not, in this example, used for any other purpose on the VLSI devices.

The unique interconnection system 35 comprising master component 41 and slaves 43 and 45 allows devices 37 and 39 to be implemented without analog circuitry. All of the data sending and receiving functions of slaves 43 and 45 are accomplished with digital circuitry, which is detailed further below. Master component 41 contains all of the required analog circuitry for facilitating and maintaining an optimum high speed state of serial data transfer between device 37 and device 39. Detail regarding the circuitry in master component 41 is also provided below.

By providing a master/slave serial interconnection system such as interconnection system 35, device manufacturers are enabled to reduce costs associated with providing many connector pins and pin drives on devices such as devices 37 and 39 to facilitate parallel data transfer. Similarly the device manufacturers need not suffer the yield problems associated with analog circuitry, as no analog circuitry is required to facilitate the slave components. Master component 41 is provided separately, and because master 41 is a low-end complexity device compared to the VLSI devices 37 and 39, the yield loss may be more readily absorbed as a cost of manufacturing. Furthermore, simplicity is restored to whatever apparatus is used a mounting structure for the devices, such as a PCB, due to the elimination of parallel data traces that would otherwise be required in a typical parallel-data interconnection.

Master component 41 controls the data rate and provides phase control and other functions associated with establishing and locking in an optimum state of high bandwidth serial transmission between devices 37 and 39.

Figure 4:
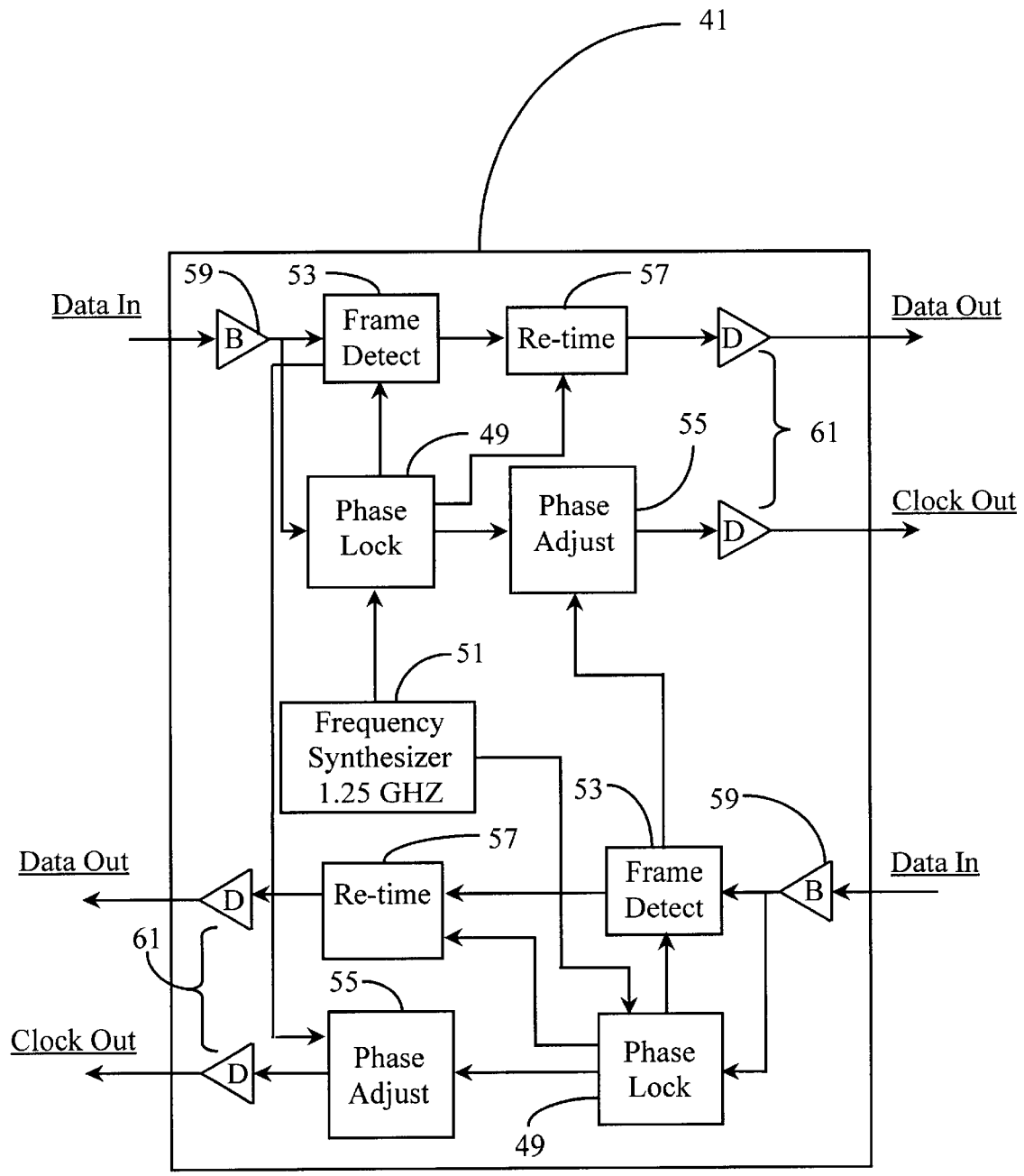
FIG. 4 is a block diagram illustrating circuitry and data flow of the master component of FIG. 3.
Figure 5:
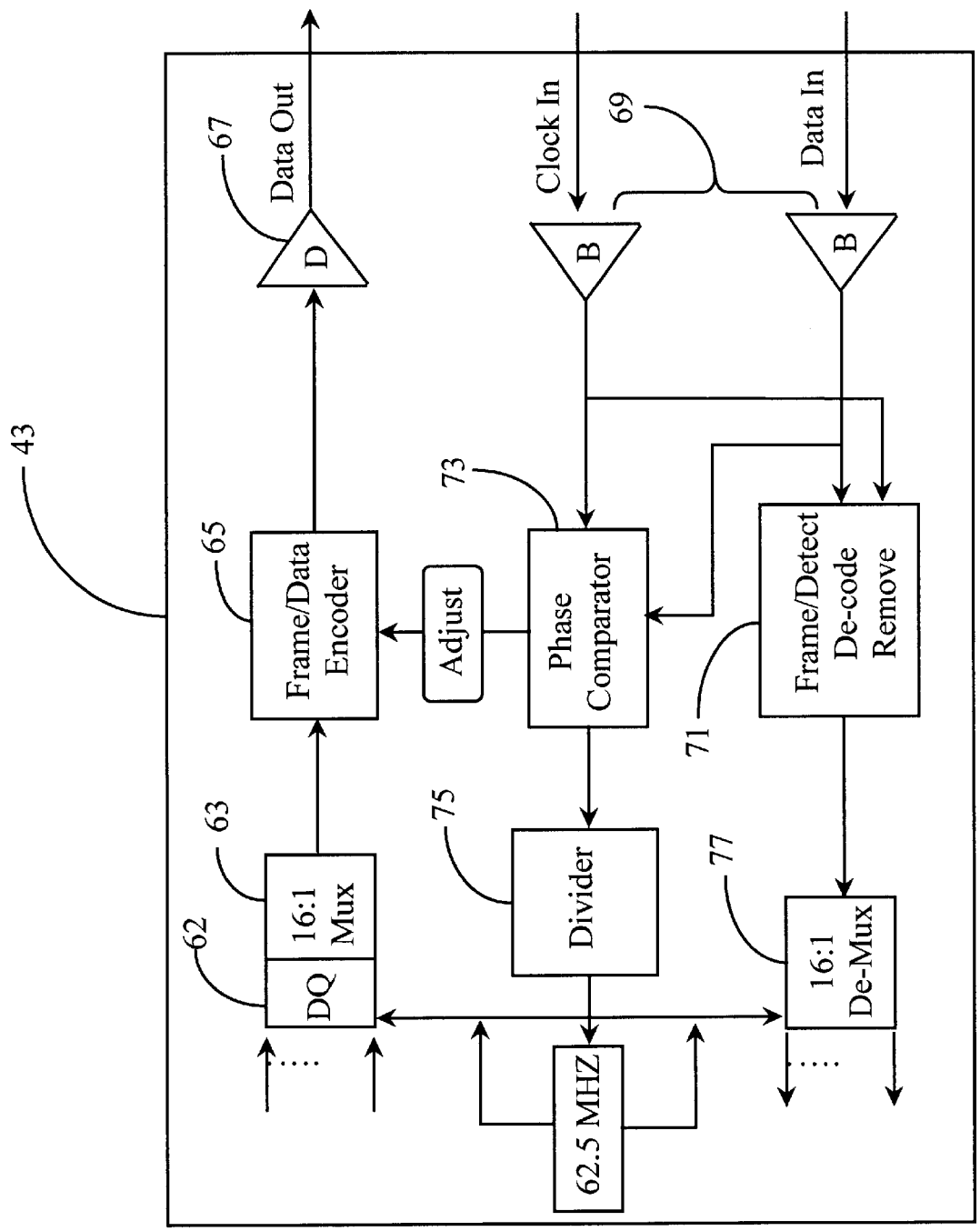
FIG. 5 is a block diagram illustrating circuitry and data flow of one of the slave components of FIG. 3.

FIG. 4 and FIG. 5 are block diagrams illustrating circuitry and data flow characteristics of master component 41 and of slave component 43 of FIG. 3. Master component 41, slave 43 and slave 45 (mirror of component 43) operate as a signal feed back and control adjustment team. That is, the phase difference (error) between clock signal and data signal is periodically detected and adjusted such that an optimum phase lock may be maintained during serial data transmission in both directions, providing error-free transmission. This kind of cooperation enables error free data transmission at extremely high clock speed necessary to surpass typical prior art parallel data transmission systems.

Referring now to FIG. 4, master component 41, as previously described, is responsible for analog function and signal-performance control of slave components 43 and 45 (FIG. 3) which are wholly digital in nature. The circuitry elements in master component 41 are illustrated herein in duplicate for the purpose of enabling complete performance control for bi-directional data transmission between separate VLSI devices, in this case, devices 37 and 39 of FIG. 3. Therefore, an element that is illustrated in duplicate shall share a common element number indicating that the elements are essentially identical. The skilled artisan will recognize that this equivalence is not required in implementations and practice of the invention, but is a convenience for illustration and explanation.

Master component 41 has a frequency synthesizer 51, the clock source for serial data timing, provided therein and adapted to generate a clock signal for generating and synchronizing data. Synthesizer 51 generates, in this example, a 1.25 GHz clock speed, which is deemed by the inventor to be sufficient for high-bandwidth serial-data transfer. Synthesizer 51 may be provided to operate at a higher speed or a lower speed if desired. Arrows labeled Clock Out represent a continuous propagation of the 1.25 Ghz clock to slaves such as slaves 43 and 45 (FIG. 3). Therefore, the clock-out arrows are analogous to clock lines 51 of FIG. 3.

An arrow labeled Data In represents encoded serial data arriving to master 41 from slave 43 (FIG. 5). A similar (Data In) arrow is illustrated on the lower right side of master 41. This arrow represents data arriving from the opposite slave, or slave 45 (FIG. 3). It is important to note here that data passing through master component 41 represents one slave component sending data to the opposite slave component. This data transfer may occur in either direction over dedicated paths, and simultaneously such that VLSI devices are in constant cooperation via signal sending and receiving slaves.

Referring again to FIG. 5, an incoming clock signal (Clock In) from master component 41 (Clock Out) is continually propagated through slave 43. The incoming clock signal goes through a buffer circuitry 69, which amplifies the signal from a typical 0.5 volt signal as carried over a supporting circuit board to a typical 3 volt signal generic to slave 43. It will be apparent to one with skill in the art that actual voltages used to carry signals may vary according to implementation parameters. Buffer circuitry 69 also is used to clean up (square up) the signal waveforms for both clock and data signal.

In order to identify and correct phase differentials between clock and data signals coming from the master, the inventor provides a system for inserting words (frames) into data signals going back to the master, the frames indicating phase error to be corrected. The inserted frames are detected and read at the master so that the clock signal may be adjusted as indicated by each inserted frame for phase realignment purposes.

Serial data that is sent to master component 41 from one of slaves 43 or 45 is first converted from parallel data, which is the format generic to other circuits in a supporting VLSI chip. A parallel to serial converter multiplexer (Mux) 63 is provided and adapted to convert the parallel data into a serial data stream. A first-in-first-(FIFO) data queue 62 is provided just ahead of Mux 63. The purpose of implementing data queue 62 has to do with the above-mentioned method for inserting frames into the data signal and is explained further below.

A frame/data encoder 65 performs the frame inserting operation and coding of the serial data stream. A frame in this embodiment is inserted after every 128 bits of data. However, other insertion intervals may be used depending on error-state and clock speed, for example. In order to accomplish frame insertion, the data signal has to be stopped temporarily and briefly. Data queue 62 is adapted to queue incoming parallel data-words while the data signal is halted for frame insertion. After a frame is inserted, data flow resumes for another 128 bits at which point another frame is inserted. In this example, a frame comprises a unique 10-bit data-word that is recognized as a particular phase-alignment error-value by master component 41 (FIG. 4). Additionally, a separate and unique coding scheme supplied by the inventor is used to further encode the serial data stream. More detail about this coding scheme is provided below.

Encoded serial data with inserted frames is propagated via a driver 67 that reduces the voltage from 3 to about 0.5 volts (in this example) for transmission over a supporting trace to master component 41 (FIG. 4). Data coming into slave 43 from master component 41, as illustrated at the lower right side of FIG. 5 represents data arriving from the opposite slave. Buffer circuitry 69 comprises circuitry for amplifying both the data and clock signals from 0.5 volts to 3 volts in this example.

The incoming data signal and the incoming clock signal are provided to a phase comparator 73. Phase comparator 73 is adapted to compare the clock and data signal phase thus determining an error value, if any. A phase adjustment command signal is selected and an adjust command is sent to frame/data encoder 65. This phase adjust command must be inserted as a frame and sent to master component 41 of FIG. 4 where the actual adjustment is made. If comparator 73 notices no error value, then the inserted frame will indicate no adjustment required. The frame representing the command is inserted in the outgoing data stream.

Referring now to FIG. 4, encoded serial data stream including inserted frames sent from slave 43 (FIG. 5) passes through a buffer 59 in master component 41, which amplifies the serial signal back to 3 volts and cleans up the waveform. Phase adjust commands (inserted frames) sent with the outgoing data-signal stream of FIG. 5 are detected by a frame detector 53 and the command is parsed and sent to a phase adjust circuit 55. Circuit 55 effects an adjustment to the outgoing clock signal destined for the same slave component that sent the frames in the incoming data stream, which is in this instance, slave 43 (FIG. 5). It is seen then that a closed loop phase check-and-adjust is accomplished continuously between the slave and the master, contributing to highly reliable, error free data transmission. An identical "check and adjust" loop occurs between the opposite slave (45 of FIG. 3) and master component 41.

A phase lock loop circuit 49 is used to assure phase between data and clock passing on through mater 41 to the opposite slave 45. This PLL controls both a retime circuitry 57 for data and phase adjust 55 for the clock going out to slave 45. Drivers 61 propagate the signals to slave 45. The same phase lock circuitry is operable for data passing through the opposite direction, as seen in FIG. 4. Thus the clock signals from master 41 to each slave may be adjusted according to the phase detection circuitry at the slave and also by the PLL circuitry.

Referring now to FIG. 5, clock and serial data signals passed through master 41 arrive at slave 43, more specifically, buffer circuitry 69. A frame detector 71 is provided and adapted to detect and remove the no-longer needed frames. A data decoding process is also performed by circuit 71 before the data is converted back into parallel data by a De-muxing circuit 77 for transfer to other parts of the supporting VLSI. At the same time both data and clock signals repeat the phase comparator process at circuit 73. The entire sequence is mirrored for slave 45 of FIG. 3 with the analog function duplicated in master component 41 (FIG. 4).

It will be apparent to one with skill in the art that the circuitry arrangements, both analog and digital, represented in FIGS. 4 and 5 may be accomplished with components that are known to the inventor and available in the art. However, the component arrangement of master 41 and slaves 43 and 45 is unique in the art.

In embodiments of the present invention VLSI device developers and manufacturers may incorporate slave designs according to the present invention into their own VLSI chips in fabrication, rendering those chips capable of cooperating with master chips also according to embodiments of this invention. The masters may be provided by the same manufacturers or be obtained from third parties. The enabled VLSI chips may then be assembled onto circuit boards and the like with compatible traces and master chips to provide the unique serial data system of the invention.

It will be apparent to the skilled artisan that there are many alterations that may be made to the embodiments described herein without departing from the spirit and scope of the invention. For example, there are a variety of analog and digital components and designs well known in the art that may be used for the element blocks illustrating the invention. It is not the specific nature of each element that is unique, but the interconnection, location and functionality, which provides a unique serial interconnection scheme not previously known in the art. There are similarly many other alterations that may be made without departing from the scope of the invention, and the invention should therefore be limited only by the claims that follow:

What is claimed is:

1. A serial data communication system for communication between a first and a second IC devices, comprising:
   a separate master chip connected to both the first and to the second IC devices by respective serial links, the master chip comprising a clock generator and circuitry for affecting serial data transmission and control between the master chip and the first and the second IC devices; and
   a first slave component residing on the first IC device and a second slave component residing on the second IC device, the first and the second slave components controlled by the master chip, the slave components for transforming data between a parallel data format used within each of the IC devices and a serial data format used for sending and receiving a serial data stream between the first and the second slave components and the master chip;

wherein the master chip provides a clock signal to both the first and the second slave components for gating serial data communication, and manages all communication between the first and the second slave components and the master chip, and wherein the first and the second slave components compare phase between the serial data stream and the clock signal received, and each send a correction code in the serial data stream sent to the master chip, the correction code indicating a correction in phase to be made between the clock signal and the serial data stream received.

2. The serial data communication system of claim 1 wherein substantially all analog circuitry is implemented on the master chip.

3. The serial data communication system of claim 1 wherein, upon receiving the correction code the master chip causes correction to be made in the phase between the clock signal and the serial data stream.

4. The serial data communication system of claim 1 wherein each slave component inserts a correction code in the serial data stream being sent to the master chip at a fixed period in the serial data stream, regardless of phase difference detected, and adjusts the correction code sent according to the phase difference detected, if any.

5. The serial data communication system of claim 4 wherein, to insert the correction code in the serial data stream being sent to the master chip, each slave component stops propagation of the serial data stream, causing data to be absorbed in a first-in-first-out (FIFO) buffer while the correction code is inserted.

6. The serial data communication system of claim 5 wherein each slave component comprises a multiplexer (mux) for parallel to serial data conversion, the mux taking parallel data from the IC device upon which each slave component resides, and converting the parallel data to serial data, and wherein the FIFO buffer is placed ahead of the mux to handle parallel rather than serial data.

7. The serial data communication system of claim 1 wherein each slave component receives serial data from the master chip, decodes the serial data and removes the correction codes, and processes the serial data via a demultiplexer to convert the serial data to parallel data.

8. A method for accomplishing serial data transfer between two IC devices, comprising the steps of:

(a) managing serial data streams between the two IC devices, each device having serial data receiving and sending slave circuitry, through a central master chip, by the master chip phase locking and retiming the data received from the first slave component before sending the data stream to the second slave component;

(b) supplying a common clock signal for the receiving and sending circuitry on the two IC devices from the central master chip; and (c) determining by each slave circuitry a phase offset between the clock signal received from the master chip and the serial data received from the master chip, and inserting a correction code in a serial data sent back to the master chip.

9. The method of claim 8 wherein the master chip receives the correction code and corrects phase accordingly between data streams and clock streams sent to each slave circuitry.

10. A method for cost-effectively providing serial communication between two IC devices, comprising the steps of:

(a) implementing multiplex, demultiplex, driver, and receiver circuitry, arranged to modulate between parallel and serial data formats, in slave circuit modules on each of the two IC devices entirely in digital circuitry;

(b) connecting the two slave circuit modules through a master chip incorporating all necessary analog circuitry for the serial communication (c) sending a common clock signal to the slave circuit modules from the master chip along with serial data sent to the slave circuit modules; and (d) determining by each slave circuit module a phase offset between the clock signal received from the master chip and the serial data received from the master chip, and inserting a correction code in a serial data sent back to the master chip.

* * * * *